A. C. PARRIS.
NUT LOCK.
APPLICATION FILED JUNE 15, 1914.

1,122,995. Patented Dec. 29, 1914.

Witnesses

Inventor
A. C. Parris.
By
Attorney

UNITED STATES PATENT OFFICE.

ALLEN C. PARRIS, OF DILLSBORO, NORTH CAROLINA.

NUT-LOCK.

1,122,995. Specification of Letters Patent. Patented Dec. 29, 1914.

Application filed June 15, 1914. Serial No. 845,177.

*To all whom it may concern:*

Be it known that I, ALLEN C. PARRIS, a citizen of the United States, residing at Dillsboro, in the county of Jackson and State of North Carolina, have invented certain new and useful Improvements in Nut-Locks, of which the following is a specification.

This invention has for its object to provide an improved nut lock embodying a spring actuated locking dog and a novel slide rod for releasing the dog to permit the removal of the nut.

Another object is the provision of simple and efficient means for locking the bolt against rotation.

Figure 1:
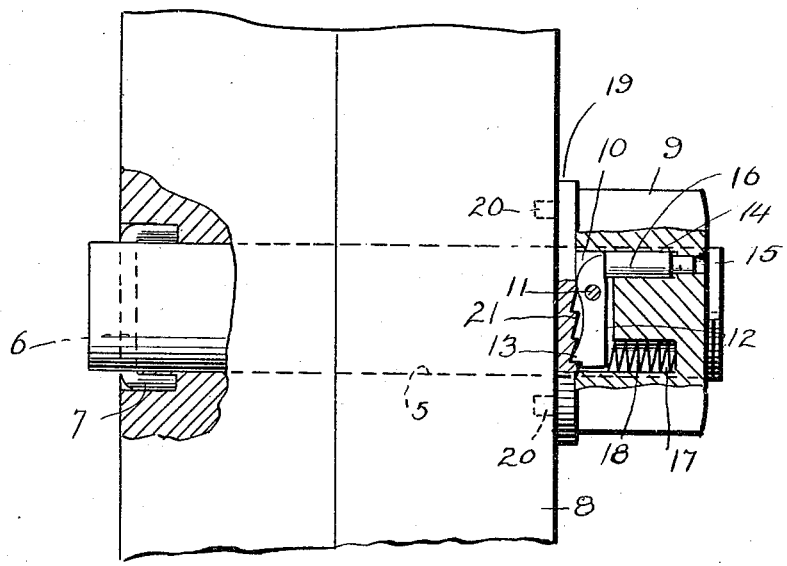
Figure 2:
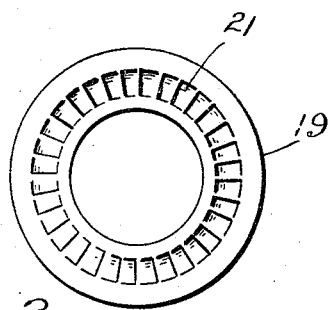
Figure 3:
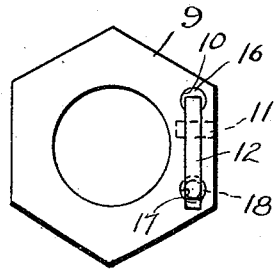
Figure 4:
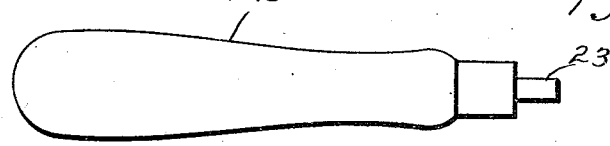

With these and other objects in view, the invention consists in the novel construction, arrangement and formation of parts as will be hereinafter specifically described, claimed and illustrated in the accompanying drawing, in which:

Figure 1 represents a side elevation, partly broken away, of a nut and bolt constructed in accordance with the invention applied to use. Fig. 2 represents a top plan view of the washer. Fig. 3 represents a front elevation of the nut. Fig. 4 represents a side elevation of a tool used in removing the nut.

Referring to the drawing in detail wherein similar reference numerals indicate corresponding parts throughout the several views, the numeral 5 indicates a bolt having a diametrical opening adjacent one end receiving the locking member 6, having the free end 7 turned inwardly against the bolt and seated in recesses formed in the wall of the bolt receiving opening in the object 8. The bolt 5 is provided with the usual threads on which is fitted a nut 9 having a recess 10 in one face in which is secured a pivot pin 11 providing a pivotal support for a dog 12 carrying an integral tooth 13. The operating dog 13 opposite the notch carrying the tooth 13 terminates adjacent the end of the transverse opening 14 formed through the nut and communicating with one end of the recess 10. The outer end 15 of the opening 14 is constricted or reduced, as indicated at 15, providing a shoulder in said opening adapted to engage a shoulder formed adjacent one end of a slide rod 16 to prevent the removal of the latter. The slide rod 16 is slidable inwardly against the short end of the dog 12 and is adapted to swing the toothed end of said dog inwardly to release the nut 9. A recess 17 is formed in the nut 9 and communicates with the recess 10, providing a seat for a spring 18 normally pressing the toothed end of the dog 12 outwardly.

A washer 19 is positioned over the bolt 5 between the object 8 and the nut 9 and is formed on its object engaging face with a plurality of integral lugs 20 embedded in the object to prevent the rotation of the washer. The nut engaging face of the washer 19 is provided with a plurality of teeth 21 adapted to coöperate with the tooth 13 of the pivoted dog 12 to prevent the removal of the nut 9 from the bolt 5. A tool 22 is provided with a shank 23 adapted to be inserted within the reduced end 15 of the transverse opening 14 through the nut 9 for pushing the slide rod 16 inwardly and disengaging the tooth 13 of the dog 12 from the teeth 21 of the washer 19 to permit the nut to be removed.

What I claim is:

In combination, a bolt, a washer positioned on said bolt having lugs projecting from one face and teeth formed on the opposite face, a nut fitted on said bolt against said washer and having an elongated recess disposed parallel with one side face of said nut, and an opening extending transversely therethrough and communicating with one end of said recess, the outer end of said transverse opening being reduced in diameter to provide a shoulder, said recess having a seat formed in one wall, a dog pivoted in said recess, a spring seated in said seat normally retaining said dog in engagement with the teeth of said washer, and a plunger slidable in said transverse opening movable against the free end of said dog and having the outer end reduced to provide a shoulder adapted to engage against the shoulder in said transverse opening to limit the outward movement of said plunger.

In testimony whereof I affix my signature in presence of two witnesses.

ALLEN C. PARRIS.

Witnesses:
J. M. LEATHERWOOD,
J. T. LEATHERWOOD.

Copies of this patent may be obtained for five cents each, by addressing the "Commissioner of Patents, Washington, D. C."